Figure 1:
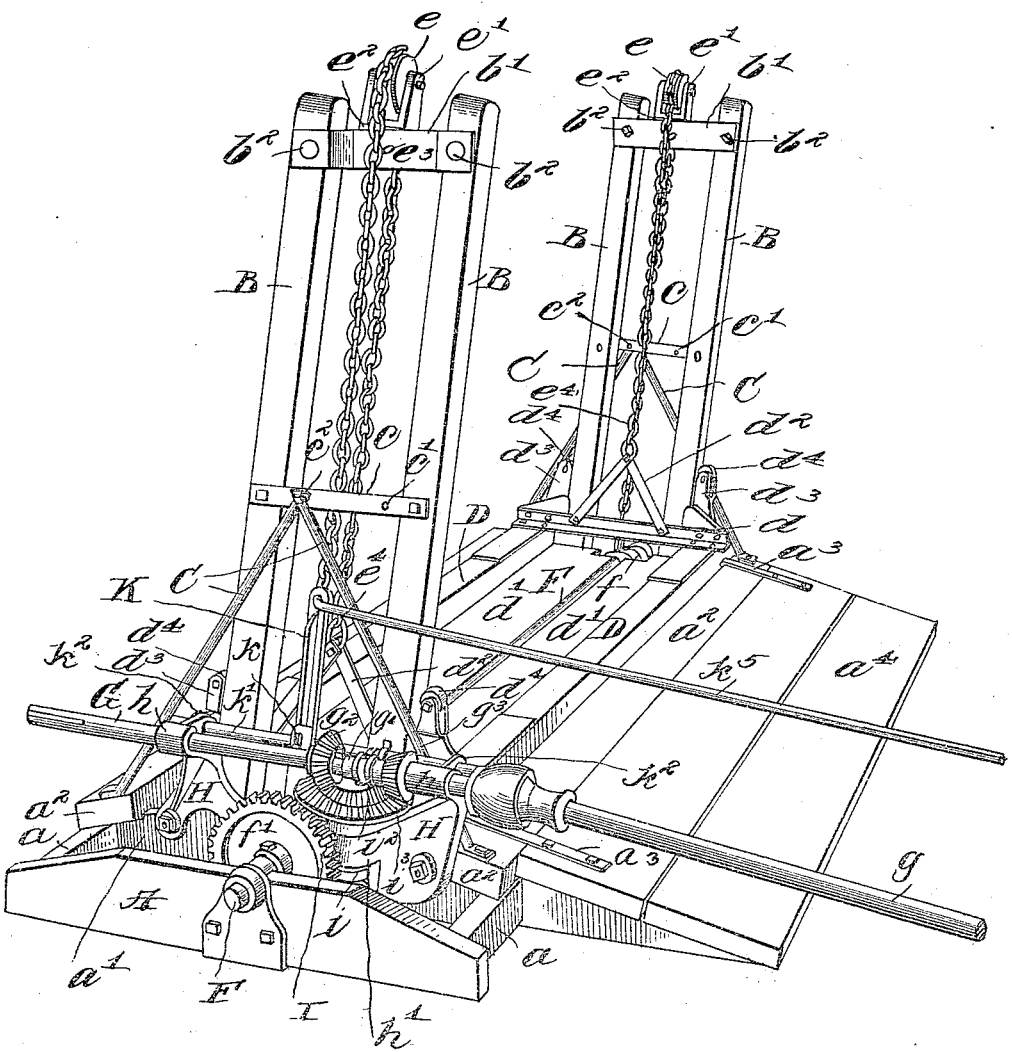

A. T. ADAMS.
WAGON JACK OR ELEVATOR.
APPLICATION FILED JUNE 15, 1909.

956,507.

Patented May 3, 1910.

3 SHEETS—SHEET 1.

Witnesses:
G. A. Nauberschmitt
George P. Hartaugh

Inventor:
Alonzo T. Adams
By Coburn & McRoberts
his Attys.

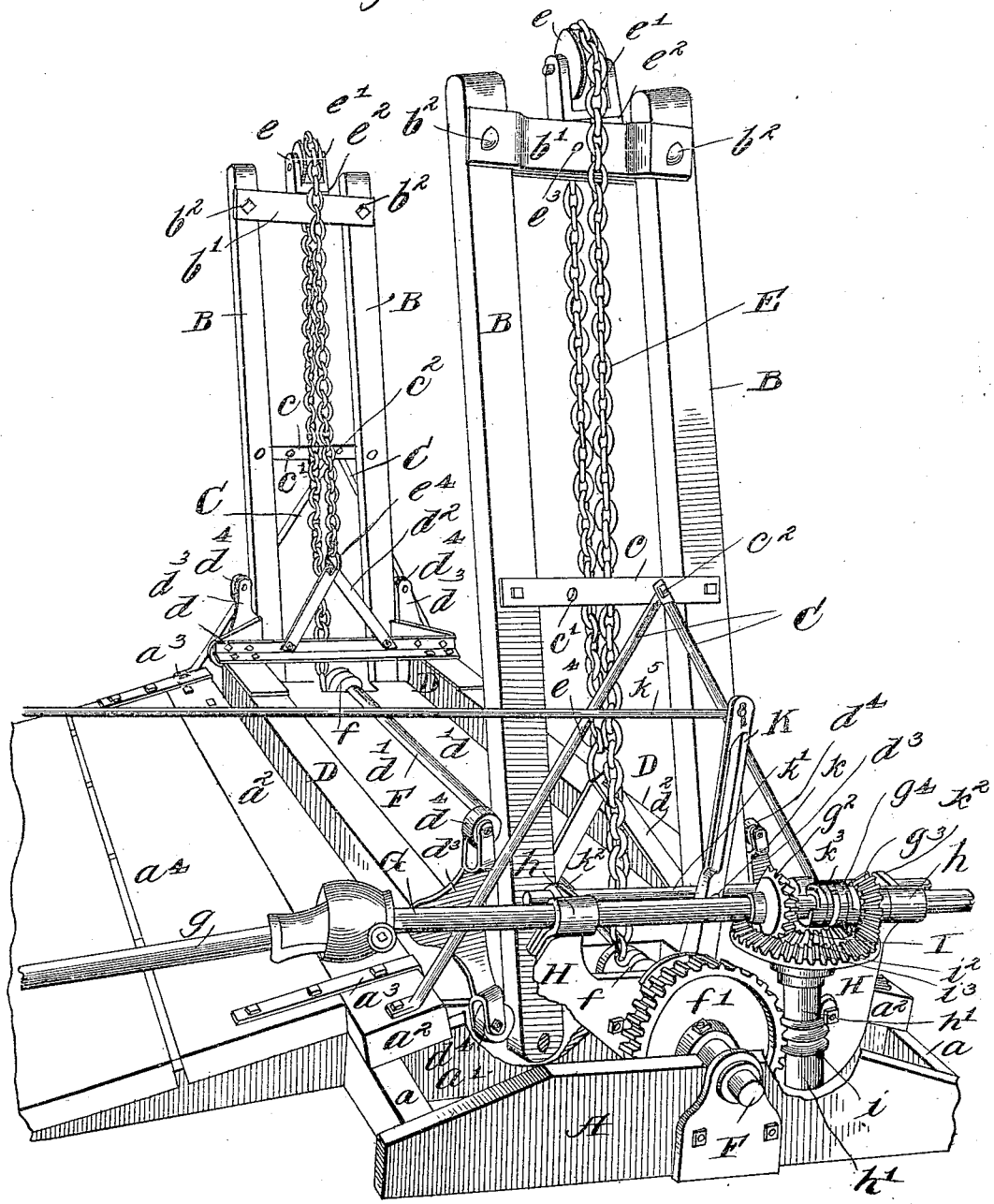

A. T. ADAMS.
WAGON JACK OR ELEVATOR.
APPLICATION FILED JUNE 15, 1909.
956,507.
Patented May 3, 1910.
3 SHEETS—SHEET 3.
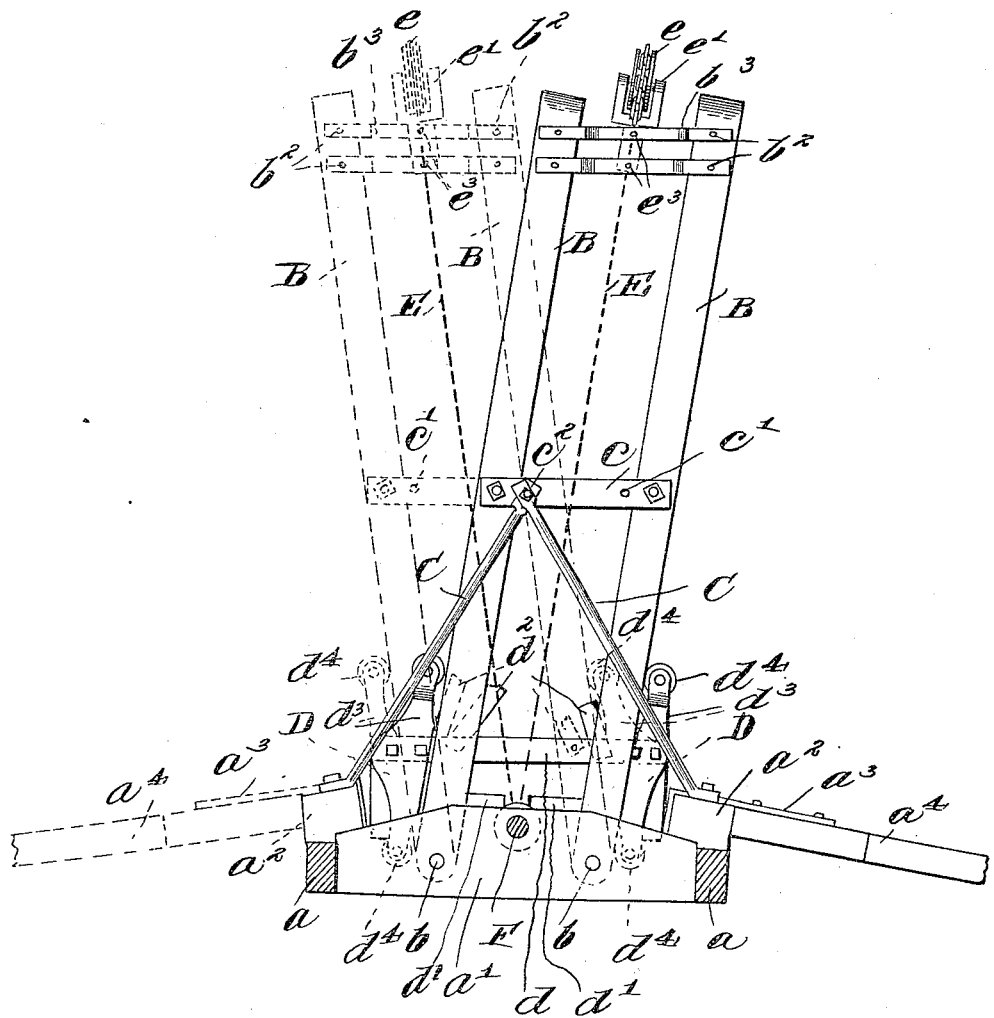
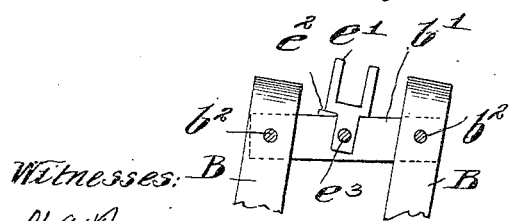
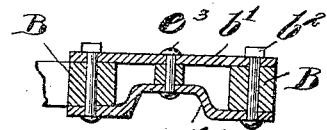

UNITED STATES PATENT OFFICE.

ALONZO T. ADAMS, OF MARSEILLES, ILLINOIS, ASSIGNOR TO MARSEILLES MANUFACTURING COMPANY, OF MARSEILLES, ILLINOIS, A CORPORATION OF ILLINOIS.

WAGON JACK OR ELEVATOR.

956,507.          Specification of Letters Patent.          Patented May 3, 1910.

Application filed June 15, 1909. Serial No. 502,282.

*To all whom it may concern:*

Be it known that I, ALONZO T. ADAMS, a citizen of the United States, residing at Marseilles, in the county of Lasalle and State of Illinois, have invented certain new and useful Improvements in Wagon Jacks or Elevators, of which the following is a specification, reference being had therein to the accompanying drawing.

This invention relates to portable wagon jacks or elevators adapted to raise the front end of a loaded wagon to dump the contents thereof from the rear end into a suitable receiving hopper for the purpose of unloading the wagon and from which it is discharged or conveyed by any suitable form of conveyer, and especially to that class of such devices wherein the elevating frame or platform upon which the front wheels of the wagon rest has a slight rearward movement as the platform is raised to permit the rear wheels of the wagon to remain stationary.

The primary object of the invention is to provide such a jack or elevator wherein the upright dumping frame itself has a slight rearward inclination to avoid drawing the rear wheels of the wagon forwardly as the front wheels are elevated or raised, and may be inclined to either side of the base whereby wagons may be dumped at either side of the jack.

Further objects relating to details of organization will be apparent from the disclosure.

The invention consists in the arrangements and organizations of parts hereinafter described and then pointed out in the appended claims.

In the accompanying drawings to which reference is had to illustrate a practical embodiment of my invention, Figure 1 is a perspective side elevation of a wagon-jack embodying my invention with the parts arranged to dump wagons at the right hand side of the device, parts being broken away for purposes of illustration; Fig. 2 is a similar view with the parts arranged to dump wagons at the left hand side of the device, Fig. 3 is a side elevation showing the dumping frame in full lines in one inclined position and in dotted lines in its other inclined position, and Figs. 4 and 5 are detail views.

The same reference letters refer to corresponding parts in the several views, and as shown in the drawings the base comprises a rectangular frame composed of the end sills A, side beams $a$ and suitable cross-braces $a'$. Upon each of the side beams and also upon the cross-braces a plank $a^2$ is rigidly bolted and adapted to overhang the side pieces so as to receive connecting hooks $a^3$ rigidly bolted to a suitable inclined guide or driveway $a^4$ whereby the guide or driveway may be interchangeably connected with each side of the base.

The dumping-frame is adjustably connected to the base, and in the present embodiment the dumping-frame consists of opposite pairs of uprights pivotally secured upon the cross-braces $a'$. In the present form the dumping-frame consists of the four uprights B arranged in pairs at each end of the base, the uprights being pivotally secured upon the cross braces $a'$ as at $b$, and each pair of uprights being connected at their upper ends by a cross-head $b'$ pivotally connected thereto as at $b^2$. The flexible connection of the uprights to the base permits the dumping frame to be inclined more or less toward either side of the base so that wagons may be dumped from either side of the jack without drawing the rear wheels forwardly. The uprights of the dumping-frame are held in inclined positions by any suitable means, and in the present embodiment I attain this end by means of braces C rigidly secured to the base and projecting upwardly to a point approximately above the median longitudinal line of the base where they are adapted to adjustably engage suitable cross-pieces $c$ pivotally connecting each pair of uprights. The cross-pieces $c$ are provided with holes $c'$ near their ends adapted to removably receive connecting bolts $c^2$ on the braces, whereby the braces may be connected to either end of the cross-pieces to hold the dumping-frame in either of its inclined positions as shown respectively in Figs. 1, 2 and 3. It is obvious from the foregoing explanation that when it is desired to shift the inclination of the dumping-frame the connecting bolts $c^2$ are disconnected from the cross-pieces $c$ in one of their positions as in Fig. 1 for example, and the dumping-frame may then be tilted or swung to its other inclined position as in Fig. 2, when the connecting bolts of the braces will be secured in the other pair of holes at the other end of the cross-pieces to lock the frame in its new inclined position. By this means the dumping frame is reversed in its inclination and is rigidly held at the proper angle of inclination for either side, the braces being readily connected and disconnected for either hitch and so that the inclination of the dumping frame will be sufficient to allow the rear wheels of the wagon to remain stationary during the necessary elevation of their front wheels when the wagons are dumped from either side of the jack.

The cross-heads $b'$ are of any suitable form or material such as steel plates or castings having end extensions to embrace the upper ends of the uprights and receive the connecting bolts $b^2$; the cross-heads support the pulley-blocks or bearings for the pulleys of the operating chains in any suitable manner.

Any suitable elevating frame or platform adapted to receive and support the front wheels of the wagon is raised and lowered upon the inclined dumping-frame by any suitable operating means. In the form shown the elevating wheel-frame or platform comprises parallel side pieces D and connecting end pieces $d$, the side pieces being suitably spaced apart to receive the front wheels of the wagon whereby the latter will be prevented from moving backward or forward. The base is provided with a floor of suitable planks $d'$ secured to the cross-braces $a'$ and adapted to fill the opening between the side pieces D when the wheel-frame or platform is lowered. This frame is raised and lowered by means of chains E which are connected at one end to the end pieces $d$ as by means of suitable bails $d^2$, and which pass over pulleys $e$ secured upon the cross-heads $b'$ and are connected at the other end to a suitable winding shaft. These pulleys are mounted in bearings and are arranged to get the pull of the chains parallel with the inclined uprights of the dumping-frame and for this purpose they may be arranged in any suitable manner. In the form shown in Fig. 1 the bearings $e'$ are in the shape of yokes resting upon wedge-shaped blocks $e^2$ whereby the yokes are slightly tilted or inclined, or one arm is raised and made slightly longer than the other, the angle of inclination of the pulleys being the same as and in extension of the angle of inclination of the uprights B. By this or any other equivalent arrangement the pull of the chains is parallel with the inclination of the uprights. The bearings are also reversible on the crossheads $b'$, being removably held thereon by removable bolts $e^3$ passing through the body of the cross-heads and depending projections on the bearings resting in recesses in the crossheads. The bearings are reversible so that the inclination or tilt of the pulleys may be reversed as the inclination of the dumping frame is changed from one side of the jack to the other, and as respectively illustrated in Figs. 1 and 2.

The chains E pass from the wheel-frame or platform over the pulleys and down to a winding shaft F which is journaled in suitable bearings upon the end-sills of the base. The winding shaft is shaped near its ends as at $f$ with spiral spools which conform to the thread of the chains and act to guide the chains thereon. When the winding shaft is rotated, the chains will be simultaneously wound up or unwound from the spools according to the direction of rotation of the shaft. Any suitable means may be employed for rotating the winding shaft and in the present embodiment I show means whereby this shaft may be rotated in either direction from a continuously driven power-shaft G which preferably is provided with means for connecting either of its ends to a tumbling rod $g$ of a suitable horse power. The shaft G is journaled in a suitable casting H supported on one of the cross-braces $a'$. The casting is provided with bearings $h$ for the shaft G and with vertical bearings $h'$ which support a short upright shaft I provided at its lower end with a worm $i$ adapted to mesh with a worm wheel $f'$ on the shaft F. The upper end of the shaft I is directly below and adjacent the power shaft G, and is provided with fixed differential bevel gears $i^2$, $i^3$, the members of which respectively mesh with suitable bevel gears $g^2$ $g^3$ loosely mounted upon the shaft G. The bevel gears $g^2$, $g^3$ are adapted to be alternately engaged by a movable clutch collar $g^4$ which is located between these bevel gears and is provided at its ends with clutch-hubs adapted to interlock with corresponding clutch-hubs on the gears in a manner now well understood in the art. The collar is adapted to be shifted longitudinally on the shaft G, to engage with either bevel $g^2$ or $g^3$, and is slidingly interlocked with the shaft by a suitable feather or key in any suitable manner, the arrangement being such that when it is in engagement with either bevel gear it will lock the same to the shaft G to communicate motion to the shaft I and thence to the winding shaft F. The parts are so arranged that the bevel gears $i^3$ and $g^3$ are employed to communicate motion to the winding shaft for raising the wheel frame or platform, and the bevel gears $i^2$ and $g^2$ are employed for reversely driving the shaft to lower the platform, and as the gear $i^2$ is smaller than the gear $i^3$ it follows that the wheel frame rises at a slower speed than it descends, the preferred ratio being that it shall come down at about three times the speed at which it rises.

The clutch collar stands intermediate its associated bevel gears when the wagon frame is not operated, and may be shifted to engage with either gear by any suitable means. For convenience of illustration I show a shifting lever K which is pivoted at one end on the base and is provided with a slot to engage a pin $k$ on a shifting rod $k'$ which is movably supported in offset bearings $k^2$ on the casting, this rod having a fixed yoke $k^3$ which works in a groove in the sliding collar so that as the rod is moved in one direction or the other it will cause the clutch sections of the collar to engage the clutch sections of one of the bevel gears $g^2$ or $g^3$. The shifting lever may be moved by a suitable means; such for example as the handle $k^5$ extending toward either side of the yoke.

The wheel-frame may be provided with guides coöperating with the dumping frame. In the form shown, these guides are in the shape of castings secured to the sides D and having upper and lower projecting arms $d^3$ provided with rollers $d^4$ running on the uprights. In the preferred form the guides are set at an angle to the longitudinal plane of the wheel-frame corresponding to the inclination of the uprights. When such guides are employed the jack cannot be reversed to dump wagons from both sides until the wagon-frame is removed from the dumping frame, it being lifted up and turned end for end, and to enable this to be readily accomplished the chains E are so constructed that the connection between the winding shaft and the wagon-frame may be broken, and this may be accomplished in any suitable manner, as for example by making one of the links of each chain in the form of a hook as shown at $e^4$.

The lifting wheel-frame always remains level or horizontal, and upon reversing this frame by turning it end for end as described it does not tilt because one side of the bails $d^2$ is shorter than the other, as the left hand side of the bail in Fig. 1 and the right hand side in Fig. 2, so that when the wheel-frame is reversed it reverses this line of draft as well as the angle of the guide-rollers.

While I have shown the chain sheaves or pulleys $e$ inclined or tilted on their supports such construction and function are not necessary as the operations of the machine are carried out just as satisfactorily and practically when the sheaves are perpendicular; when they are perpendicular they need not be reversed upon the reversal of the wheel frame. When it is desired to tilt them any construction may be employed for this purpose, and in Fig. 3 I show an organization wherein these pulleys or sheaves are automatically tilted from one side to the other to correspond with the direction of inclination of the dumping-frame. In this form the cross-heads are composed of opposite pairs of parallel pieces $b^3$ loosely pivoted to the uprights at $b^2$ in the form of parallel rulers, and the lower projections on the bearings $e'$ are loosely pivoted to each pair at $e^3$, so that as the dumping frame is shifted from side to side the inclination of the pulleys will be automatically changed to correspond. Of course with this last form, the bearings thus are automatically reversed when the wheel-frame is reversed.

When it is desired to dump wagons on the right side of the jack or elevator the dumping frame is set at the inclination shown in Fig. 1 for example. A loaded wagon is driven to place with its front wheels passing up the inclined guide and resting upon the wheel frame, and the clutch collar is shifted to lock the bevel gear $g^3$ to the shaft G, whereby motion is imparted through the intermediate gearing to the winding shaft F in a direction to wind the chains thereon to raise the wheel-frame along the dumping-frame. As the wheel-frame travels upwardly, it also moves slightly rearwardly owing to the inclination of the dumping-frame so as to permit the rear wheels of the wagon to remain stationary. When the wheel-frame is raised to sufficient height to cause all the load to flow out of the open rear end of the wagon, the clutch collar is shifted to lock the bevel gear $g^2$ to shaft G whereby motion in reverse direction and at accelerated speed is imparted to shaft F to unwind the chains to lower the wheel-frame, and when the frame reaches its lower position the clutch collar may be shifted to neutral position intermediate and out of engagement with the clutch-hubs of both bevel gears, when the wagon may be driven off and another driven to position on the wheel-frame to be in turn dumped by repeating the operation.

When it is desired to dump wagons on the left side of the jack as in Fig. 2, assuming that the device is set for dumping on the right side as in Fig. 1 the chains are disconnected by the hooks or other connections employed, the wheel-frame is lifted off the uprights which are uncoupled from the braces and shifted over to their other inclined position where they are again secured by the braces engaging the other end of the cross-pieces $c$, the wheel-frame is reversed end for end and placed in position again on the uprights with its chains connected by the hooks, and the parts are then in position to dump wagons at the left side as in Fig. 2. Of course it is to be understood that when inclined guides on the wheel-frame are not used, this frame need not be reversed and so need not be lifted off the dumping-frame, and the chain-pulleys need not be reversed when they are perpendicular to their frames.

I do not limit myself to the details of form, construction or arrangement shown in the drawings, as obviously changes and variations in these respects may be made without departing from the spirit or scope of my invention.

Having described my invention, I claim—

1. In a wagon-jack, a base, a reversible inclined dumping-frame pivoted on the base, means to hold the frame in inclined position toward either side of the base, a wheel-frame slidingly mounted on the dumping frame, and means on the dumping-frame for raising and lowering the wheel-frame and movable with the frame toward either side of the base.

2. In a wagon-jack, a base, a reversible inclined dumping-frame pivoted on the base, means to hold the frame in inclined position toward either side of the base, a wheel-frame slidingly mounted on the dumping-frame, pulleys on the dumping frame and movable therewith toward either side of the base, flexible connections from the wheel-frame passing over the pulleys, and means to operate the flexible connections to raise and lower the wheel-frame on the dumping-frame.

3. In a wagon jack, a base, uprights movably mounted on the base and providing a dumping-frame, a wheel-frame in sliding engagement with the dumping frame and adapted to support the end of a wagon, means on the uprights for raising and lowering the wheel-frame on the uprights and movable therewith toward either side of the base, and means for inclining the uprights toward either side of the base.

4. In a wagon jack, a base, uprights movably mounted on the base and providing a dumping-frame, a wheel-frame in sliding engagement with the dumping-frame and adapted to support the end of a wagon, means on the uprights for raising and lowering the wheel-frame on the uprights and movable therewith toward either side of the base, and braces to hold the uprights in inclined position toward either side of the base.

5. In a wagon jack, a base, uprights movably mounted on the base and providing a dumping-frame, a wheel-frame in sliding engagement with the dumping-frame and adapted to support the end of a wagon, pulleys on the uprights and movable therewith toward either side of the base, flexible connections running over the pulleys for raising and lowering the wheel-frame on the uprights, and braces to hold the uprights inclined toward either side of the base.

6. In a wagon jack, a base, uprights pivotally mounted in pairs on the base, a cross-head pivoted to the uprights of each pair, means to hold the uprights in inclined position on either side of the center of the base, pulleys on the cross-heads of the uprights, a wagon-frame slidable on the uprights and adapted to support the front wheels of a wagon, chains on the wagon-frame running over the pulleys, and means to wind and unwind the chains to raise and lower the wagon-frame on the uprights.

7. In a wagon jack, a base, uprights pivotally mounted in pairs on the base, a cross-head pivoted to the uprights of each pair, braces to hold the uprights in inclined position on either side of the center of the base, pulleys on the cross-heads of the uprights, a wagon-frame movable on the uprights and adapted to support the front wheels of a wagon, inclined guides on the wagon-frame, chains on the wagon-frame running over the pulleys, and means to wind and unwind the chains to raise and lower the wagon-frame on the uprights.

8. In a wagon jack, a base, uprights pivotally mounted in pairs on the base, a cross-head pivoted to the uprights of each pair, means to hold the uprights in inclined position on either side of the center of the base, pulleys on the cross-heads of the uprights, a wagon-frame movable on the uprights adapted to support the front wheels of a wagon, inclined guides on the wagon frame having rollers bearing on the uprights, chains on the wagon-frame running over the pulleys, and means to wind and unwind the chains to raise and lower the wagon-frame on the uprights.

9. In a wagon jack, a base, uprights pivotally mounted in pairs on the base, a cross-head pivoted to the uprights of each pair, means to hold the uprights in inclined position toward either side of the base, pulleys on the cross-heads of the uprights, a wheel-frame movable on the uprights and adapted to support the front wheels of a wagon, inclined guides on the wheel-frame adapted to the uprights in either inclined position, and means including flexible connections passing over the pulleys to raise and lower the wheel-frame on the uprights.

10. In a wagon jack, a base, uprights pivotally mounted in pairs on the base, a cross-head pivoted to the uprights of each pair, means to hold the uprights in inclined position toward either side of the base, pulleys on the cross-heads of the uprights, a wheel-frame movable on the uprights and adapted to support the front wheels of a wagon, guides on the wheel-frame inclined to correspond with the inclination of the uprights, and means including flexible connections passing over the pulleys to raise and lower the wheel-frame on the uprights.

11. In a wagon jack, a base, uprights pivotally mounted on the base, means to hold the uprights in inclined position toward either side of the base, pulleys on the uprights, a reversible wheel-frame movable on the uprights and adapted to support the front wheels of a wagon, and means including flexible connections passing over the pulleys to raise and lower the wheel-frame on the uprights at different speeds.

12. In a wagon jack, a base, uprights movably mounted on the base and providing a dumping-frame, a wheel-frame reversibly mounted on the dumping-frame and adapted to support the end of a wagon, means on the uprights for raising and lowering the wheel-frame, means for holding the uprights in inclined position toward either side of the base, and inclined guides on the wheel-frame adapted to engage the uprights in either position of the wheel-frame.

13. In a wagon jack, a base, uprights movably mounted on the base and providing a dumping-frame, a wheel-frame reversibly mounted on the dumping-frame and adapted to support the end of a wagon, inclined pulleys on the uprights, means on the pulleys for raising and lowering the wheel-frame, means for holding the uprights in inclined position toward either side of the base, and inclined guides on the wheel-frame adapted to engage the uprights in either position of the wheel-frame.

14. In a wagon jack, a base, uprights movably mounted on the base and providing a dumping-frame, a wheel-frame reversibly mounted on the dumping-frame and adapted to support the end of a wagon, reversible inclined pulleys on the uprights, means on the pulleys for raising and lowering the wheel-frame, means for holding the uprights in inclined position toward either side of the base, and inclined guides on the wheel-frame adapted to engage the uprights in either position of the wheel-frame.

15. In a wagon jack, a base, uprights pivotally mounted on the base, means to hold the uprights in inclined position on either side of the center of the base, reversible pulleys on the uprights, a reversible wagon-frame in sliding engagement with the dumping-frame and adapted to support the front wheels of a wagon, detachable chains on the frame running over the pulleys, and means to wind and unwind the chains to raise and lower the wagon-frame on the uprights.

16. In a wagon jack, a base, uprights pivotally mounted on the base, braces to hold the uprights in inclined position on either side of the center of the base, reversible pulleys on the uprights, a reversible wagon-frame in sliding engagement with the dumping frame and adapted to support the front wheels of a wagon, detachable chains on the frame running over the pulleys, and means to wind and unwind the chains to raise and lower the wagon-frame on the uprights at different speeds.

17. In a wagon jack, a base, uprights pivotally mounted on the base, braces to hold the uprights in inclined position on either side of the center of the base, reversible inclined pulleys on the uprights, a reversible wagon-frame adapted to support the front wheels of a wagon, detachable chains on the frame running over the pulleys, and means to wind and unwind the chains to raise and lower the wagon-frame on the uprights at different speeds.

In testimony whereof I affix my signature in presence of two witnesses.

ALONZO T. ADAMS.

Witnesses:
GEORGE R. HARBAUGH,
J. McROBERTS.